United States Patent
Holmes et al.

(10) Patent No.: US 7,748,482 B2
(45) Date of Patent: Jul. 6, 2010

(54) ACCESSORY DRIVE SYSTEM FOR A HYBRID VEHICLE

(75) Inventors: Alan G. Holmes, Clarkston, MI (US); Peter J. Savagian, Bloomfield Hills, MI (US); Tim M. Grewe, Northville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 722 days.

(21) Appl. No.: 11/552,691

(22) Filed: Oct. 25, 2006

(65) Prior Publication Data
US 2008/0099256 A1 May 1, 2008

(51) Int. Cl.
*B60K 6/42* (2007.10)
(52) U.S. Cl. ............ 180/65.22; 180/65.27; 180/65.275; 180/53.5; 180/53.8
(58) Field of Classification Search .............. 180/65.21, 180/65.22, 65.27, 65.275, 53.5, 53.8
See application file for complete search history.

(56) References Cited

U.S. PATENT DOCUMENTS

| | | | |
|---|---|---|---|
| 6,083,139 A * | 7/2000 | Deguchi et al. ................. 477/5 |
| 6,371,878 B1 * | 4/2002 | Bowen ........................... 475/5 |
| 6,484,830 B1 * | 11/2002 | Gruenwald et al. .... 180/65.245 |
| 6,501,190 B1 * | 12/2002 | Seguchi et al. ................. 290/46 |
| 6,598,496 B2 * | 7/2003 | Pannell ...................... 74/665 L |
| 6,729,998 B2 * | 5/2004 | Egami ........................... 477/3 |
| 6,817,432 B2 * | 11/2004 | Kitada et al. ........... 180/65.245 |
| 6,829,893 B2 * | 12/2004 | Doerr et al. ................. 60/605.1 |
| 7,119,454 B1 * | 10/2006 | Chiao ......................... 307/9.1 |
| 2004/0060752 A1 * | 4/2004 | Oshida et al. .............. 180/65.2 |
| 2004/0082419 A1 * | 4/2004 | Randall ...................... 475/149 |
| 2006/0019784 A1 * | 1/2006 | Sowul et al. ................... 475/5 |
| 2006/0025265 A1 * | 2/2006 | Sowul et al. ................... 475/5 |

* cited by examiner

*Primary Examiner*—Jeffrey J Restifo
*Assistant Examiner*—Erez Gurari
(74) *Attorney, Agent, or Firm*—Quinn Law Group, PLLC

(57) ABSTRACT

The present invention provides an accessory drive system for a hybrid vehicle. The accessory drive system includes an inverter operatively connected to a direct current battery. The inverter is configured to convert the direct current from the battery into three-phase alternating current. The accessory drive system also includes a transmission having a first motor/generator operable to drive the hybrid vehicle. The first motor/generator is a Y-connected three phase motor/generator that defines a first neutral point. A second motor/generator is connected to an accessory and to the first neutral point. Output from the battery is transferable through the first neutral point to the second motor/generator such that the accessory is driven at a selectable rate.

7 Claims, 3 Drawing Sheets

ACCESSORY DRIVE SYSTEM FOR A HYBRID VEHICLE

TECHNICAL FIELD

The present invention pertains generally to an accessory drive system for a hybrid vehicle.

BACKGROUND OF THE INVENTION

Driven accessories in a hybrid vehicle may include, for example, an air conditioning compressor, a power steering pump, a power brake system, an alternator for supplying low-voltage electricity for lights and so forth, and/or a transmission oil pump. These accessories are generally powered by output from the engine. Some of the accessories in a hybrid vehicle may require power while the engine is off and the vehicle is being powered by an alternate power source such as an electric motor/generator.

SUMMARY OF THE INVENTION

The present invention provides an accessory drive system for a hybrid vehicle. The accessory drive system includes an inverter operatively connected to a direct current battery. The inverter is configured to convert the direct current from the battery into three-phase alternating current. The accessory drive system also includes a transmission having a first motor/generator operable to drive the hybrid vehicle. The first motor/generator is a Y-connected three phase motor/generator that defines a first neutral point. A second motor/generator is connected to an accessory and to the first neutral point. Output from the battery is transferable through the first neutral point to the second motor/generator such that the accessory is driven at a selectable rate.

The accessory drive system may also include an engine driveably connected to the accessory via a torque transfer apparatus (e.g., a plurality of pulleys and a belt) such that the accessory can be selectively driven by the engine or the second motor/generator.

The accessory drive system may also include a selectively engageable torque transmitting device (e.g., a one-way clutch) configured to interrupt the transmission of torque from the third motor/generator to the engine such that the second motor/generator can be implemented to drive the accessory without also driving the engine.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
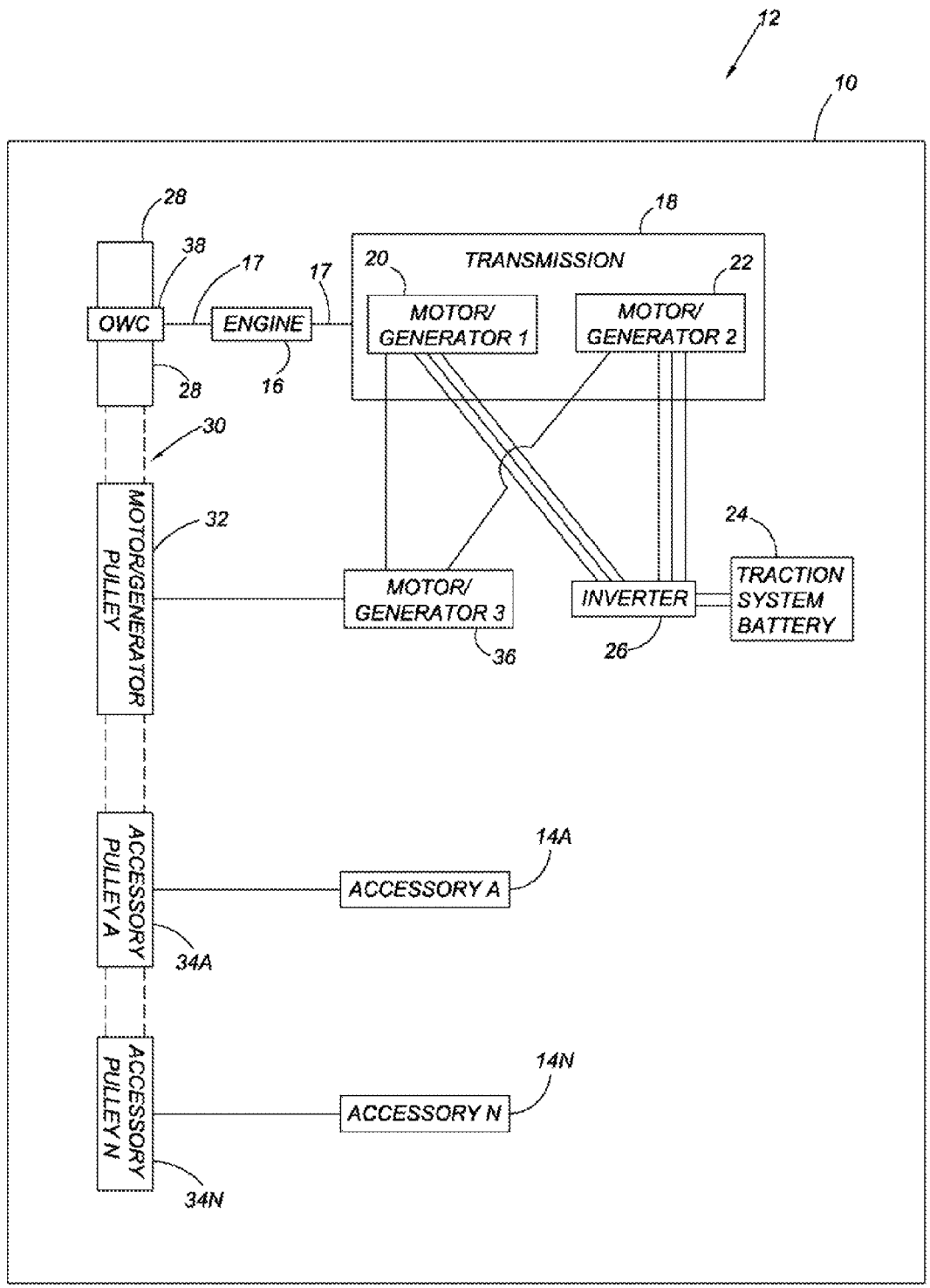
FIG. 1 is a schematic depiction of an accessory drive system for a hybrid vehicle.

Referring to FIG. 1, a schematic representation of an accessory drive system 10 for a hybrid vehicle 12 is shown. The hybrid vehicle 12 includes a plurality of accessories 14A-14N which may include, for example, an air conditioning compressor, a power steering pump, a power brake system, an alternator, and/or a transmission oil pump. The accessory drive system 10 is configured to drive the accessories 14A-14N with output from an engine 16 when the engine 16 is running, and to drive the accessories 14A-14N with a supplemental power source when the engine 16 is off. It should be appreciated that the hybrid vehicle 12 is shown for exemplary purposes, and that the accessory drive system 10 may be implemented with other hybrid vehicles.

The engine 16 is configured to transmit output to a transmission 18 via a crankshaft or output shaft 17. The transmission 18 will hereinafter be described as an electrically variable transmission (EVT) having first and second motor/generators 20, 22 which are used to vary the mechanical speed ratio through the transmission 18. The first and second motor/generators 20, 22 are operable to power the hybrid vehicle 12 for vehicle propulsion and are generally alternately implemented such that one motor/generator operates as a motor while the other motor/generator operates as a generator. The first and second motor/generators 20, 22 are preferably three-phase Y-connected electric motor/generators. It should, however, be appreciated that the present invention is also applicable to alternate transmission configurations and motor/generator configurations. The first and second motor/generators 20, 22 are powered by a traction system battery 24. The traction system battery 24 is preferably a 300 volt direct current (DC) battery. An inverter 26 converts the DC output from the traction system battery 24 into a three-phase alternating current (AC) to power the first and second motor/generators 20, 22.

A crankshaft pulley 28 is operatively connected to the crankshaft 17. A belt 30 couples the crankshaft pulley 28 with a motor/generator pulley 32 and a plurality of accessory pulleys 34A-34N. The motor/generator pulley 32 is operatively connected to a third motor/generator 36. The accessory pulleys 34A-34N are each operatively connected to an accessory 14A-14N, respectively, such that the rotation of the accessory pulleys 34A-34N powers the accessories 14A-14N. Accordingly, the belt 30 can transfer torque from either the engine 16 or the third motor/generator 36 to rotate the accessory pulleys 34A-34N and thereby power the accessories 14A-14N.

According to the preferred embodiment, the third motor/generator 36 is connected to the neutral points $N_1$, $N_2$ (shown in FIG. 2) of the first and second motor/generators 20, 22. Therefore, current from the traction system battery 24 is transferable through the first and second motor/generators 20, 22 in order to power the third motor/generator 36. The third motor/generator 36 is operational as an electric motor to drive the accessories 14, and it is preferably a universal motor, which operates on direct current or alternating current with a shaft speed proportional to the RMS (root mean square) voltage across the motor. Generated electricity from the third motor/generator 36 is preferably transferred to and stored in the traction system battery 24; however, such electricity may alternatively be stored in any conventional energy storage device such as, for example, a 12 volt engine battery (not shown). As will be described in detail hereinafter, additional motor/generators (not shown) each configured to power one or more accessories (not shown) may also be operatively connected to the neutral points $N_1$, $N_2$ (shown in FIG. 2) of the first and second motor/generators 20, 22.

A selectively engageable torque transmitting device such as the one-way clutch 38 is preferably operatively connected to the crankshaft 17 coaxially between the engine 16 and the crankshaft pulley 28. The one-way clutch 38 is a conventional device configured to lock-up and transmit torque in a first direction (e.g., from the engine 16 to the crankshaft pulley 28); and to free-wheel and thereby interrupt the transfer of torque in a second direction (e.g., from the crankshaft pulley 28 to the engine 16). The one-way clutch 38 is preferably implemented to allow the third motor/generator 36 to efficiently power the accessories 14A-14N when the engine 16 is off. More precisely, the one-way clutch 38 prevents the engine 16 from being back-driven by output from the third motor/generator 36 and thereby ensures that such output is transferred to the accessories 14A-14N in an efficient manner.

Figure 2:
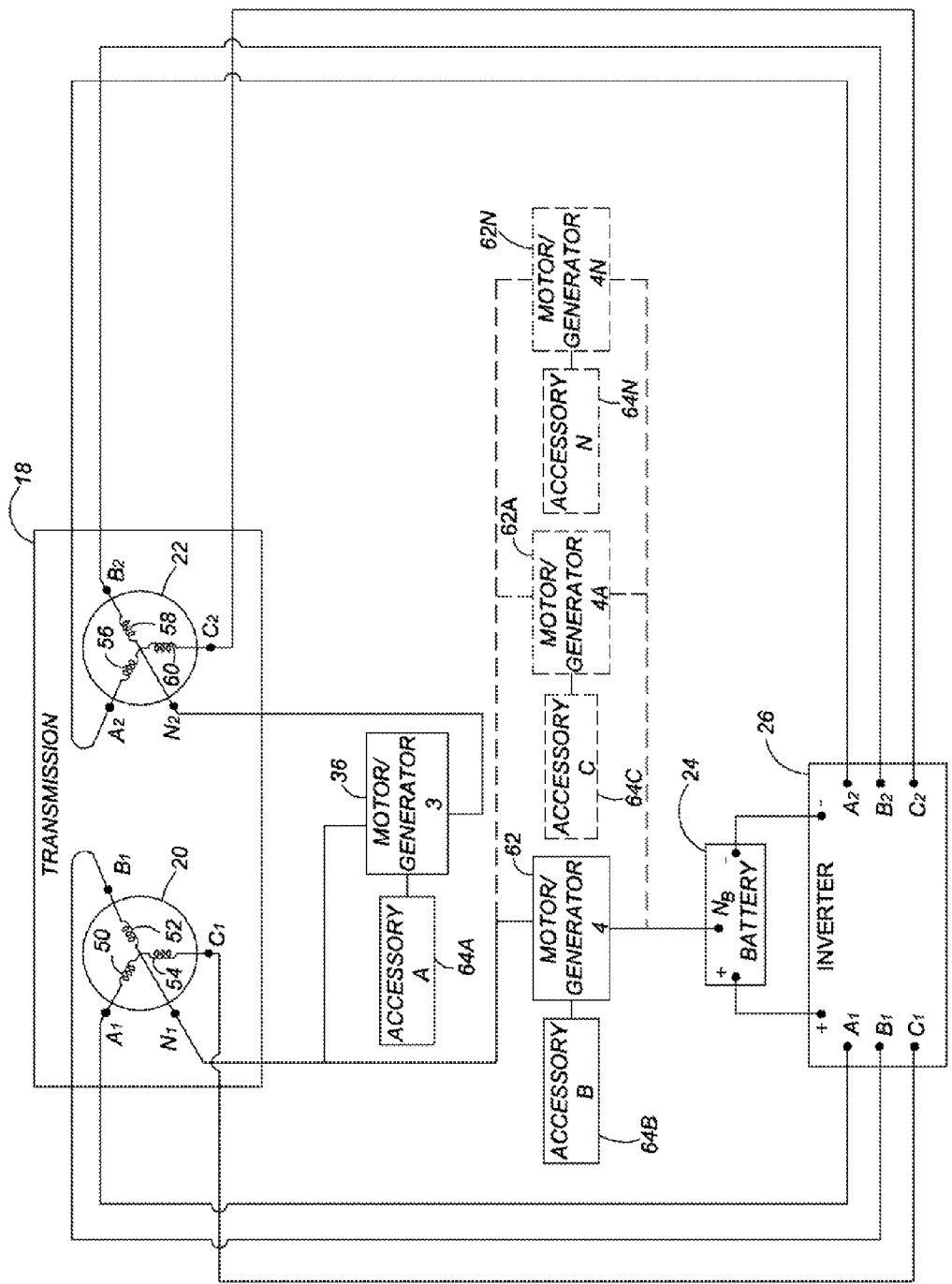
FIG. 2 is a preferred electrical system connection schematic for the accessory drive system of FIG. 1.

Referring to FIG. 2, a preferred electrical system connection schematic for the accessory drive system 10 is shown. Like reference numbers are used in FIG. 2 to refer to like components from FIG. 1.

The first motor/generator 20 is a three-phase Y-connected electric motor/generator having three terminals $A_1$, $B_1$, and $C_1$. The terminals $A_1$, $B_1$, and $C_1$ are respectively connected to coils or windings 50, 52 and 54. The coils 50, 52 and 54 are connected together to define a neutral point $N_1$. The second motor/generator 22 also has three terminals $A_2$, $B_2$, and $C_2$ which are respectively connected to coils or windings 56, 58 and 60. The coils 56, 58 and 60 are connected together to define a neutral point $N_2$.

The traction system battery 24 produces direct current. The inverter 26 converts the direct current from the battery 24 to three-phase alternating current, and sends a separate phase to each of the terminals $A_1$, $B_1$ and $C_1$ in order to power the first motor/generator 20. The inverter 26 also sends a separate phase of alternating current to each of the terminals $A_2$, $B_2$ and $C_2$ in order to power the second motor/generator 22.

Still referring to FIG. 2, the electrical connections of the neutral points $N_1$, $N_2$ of the first and second motor/generators 20, 22 to the third motor/generator 36 and a fourth motor/generator 62 are shown in more detail. More precisely, the neutral point $N_2$ of the second motor/generator 22 is connected to the third motor/generators 36; the third motor/generator 36 is connected to the neutral point $N_1$ of the first motor/generator 20; the neutral point $N_1$ of the first motor/generator 20 is connected to the fourth motor/generator 62; and the fourth motor/generator 62 is connected to a point on the traction system battery 24 such as, for example, the battery neutral point $N_B$. Accordingly, current from the battery 24 is transferable through the first and second motor/generators 20, 22 in order to power the third and fourth motor/generators 36, 62. The output of the third and fourth motor/generators 36, 62 is controllable by varying the frequency and/or voltage from the battery 24 in a manner that does not significantly affect the operation of the first and second motor/generators 20, 22. As an example, by generally simultaneously increasing the voltage transferred to each of the three phases of the second motor/generator 22, the output of the third motor/generator 36 can be correspondingly increased without impacting the second motor/generator 22 performance. The accessories 64A-64N can therefore be driven at a selectable rate without otherwise affecting vehicle 12 (shown in FIG. 1) operation.

As is well known in the art, as the mechanical speed ratio through an EVT with two motor/generators is varied, the speed of one motor/generator typically rises while the speed of the other motor/generator falls, so that the two motor/generators never achieve their maximum speeds simultaneously. In general, the voltage requirement for a motor/generator is typically at its maximum at the maximum speed of the motor/generator. In an inverter-fed three-phase, Y-connected motor/generator, independent control of voltage at the neutral point can be achieved, but only by limiting the maximum voltage that may be applied to the phases of the motor/generator by the same amount. In an EVT, both motors do not reach their maximum speeds together, so they do not reach their maximum voltage requirements together, and so independent control of the voltage from one neutral point to another may be achieved in an EVT without sacrifice and used to operate a third motor for accessories.

Additional motor/generators such as the motor/generators 62A-62N may be connected in parallel with the motor/generator 62 such that the motor/generators 62A-62N are also powered by the battery 24 via the neutral points $N_1$, $N_2$. Similarly, additional motor/generators (not shown) can be connected in parallel with the motor/generator 36. The motor/generators 36, 62 and 62A-62N are each shown as being operatively connected to single accessory 64A-64N. Alternatively, the individual motor/generators 36, 62 and 62A-62N may each be adapted to drive multiple accessories with the implementation of a belt and pulley system (not shown) similar that previously described with respect to FIG. 1. Motor/generators used to drive accessories and connected in parallel, such as motor generators 62 and 62A-62N, may be of different types, such as universal (which is relatively insensitive to frequency) and AC induction (which is relatively sensitive to frequency), so that these motors may be, to some extent, controlled separately by control of the applied voltage and electrical frequency from $N_1$ to $N_B$. Individual motor/generators 62 and 62A-62N may be constructed or equipped so as to respond preferentially or only to positive voltage or to respond preferentially or only to negative voltage, so as to allow them to be controlled separately from other individual motor/generators 62 and 62A-62N which respond equally to both positive and negative voltage. Thus, the former motors would be sensitive to the offset, and to the amplitude, of an applied voltage from $N_1$ to $N_B$, but the latter motors would be insensitive to the offset, and sensitive to the amplitude. It should be easily understood by those skilled in the art that offset, or any other direct current, would not pass through an isolation transformer, if one were added to the circuit, but that one or more isolation transformers (not shown) could be used as routine parts of the circuits to connect the neutral points $N_1$ and $N_2$ and/or $N_1$ and $N_B$, to any or all of the motor/generators 36 and/or 62 and 62A-62N, respectively, to transmit pure alternating current to those motor/generators without otherwise affecting the operation of the invention.

Figure 3:
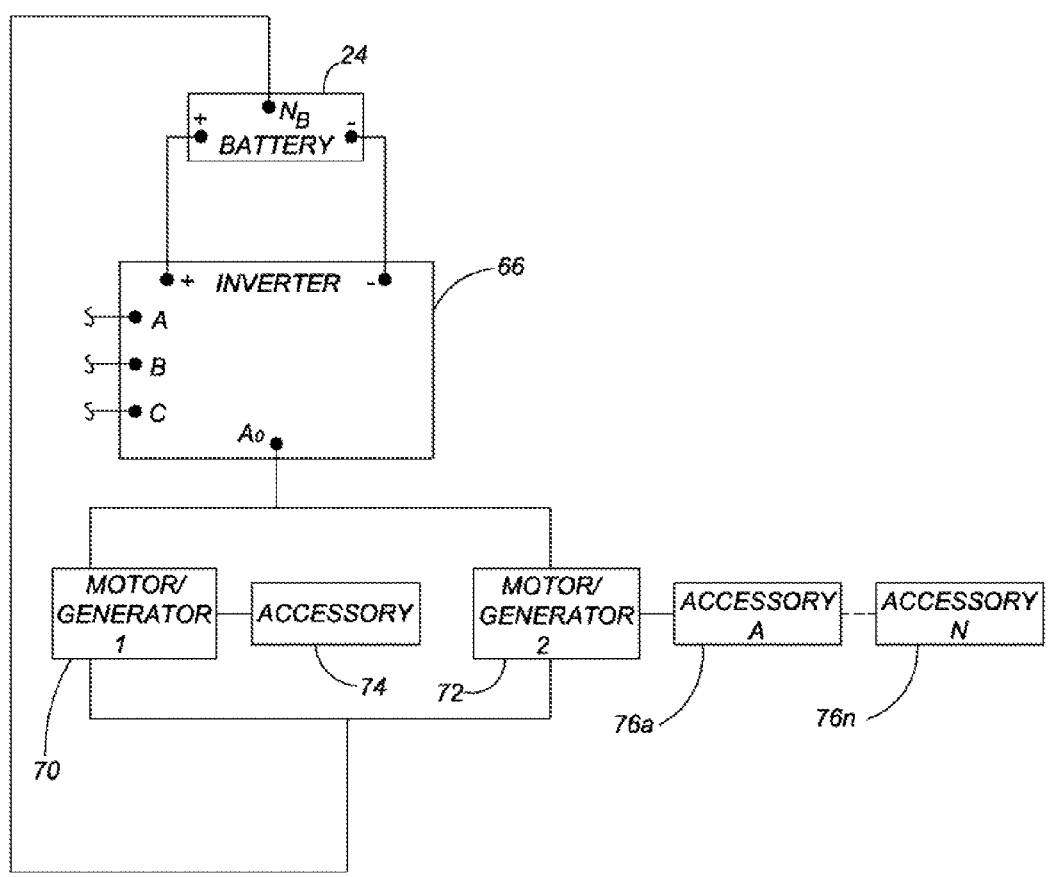
FIG. 3 is an alternate electrical system connection schematic for the accessory drive system of FIG. 1.

Referring to FIG. 3, an alternate electrical system connection schematic for the accessory drive system 10 is shown. Like reference numbers are used in FIG. 3 to refer to like components from FIGS. 1 and 2.

The inverter 66 converts direct current from the battery 24 to three-phase alternating current in a manner similar to that described hereinabove with respect to the inverter 26 (shown in FIGS. 1 and 2). The inverter 66 also includes an extra terminal or phase $A_0$. The inverter 66 is configured to transfer alternating current through the terminal $A_0$ in order to run a first and second motor/generator 70, 72 connected in parallel. These motors 70, 72, may be of different types, as above, such as universal and AC induction, to allow some measure of independent speed control by varying both the voltage from $A_0$ to $N_B$ and the frequency of any variation in voltage from $A_0$ to $N_B$.

The first motor/generator 70 is preferably an induction motor which is sensitive to the frequency of the supplied alternating current. The first motor/generator 70 is configured to drive an accessory 74. The second motor/generator 72 is preferably a universal motor which is relatively insensitive to the frequency of the supplied alternating current. The second motor/generator 72 is configured to drive one or more accessories 76A-76N. Therefore, the frequency of the alternating current from the inverter 66 can be varied to control the speed at which the first motor/generator 70 drives the accessory 74 without impacting the operation of the second motor/generator 72. Similarly, the voltage from the inverter 66 can be varied to control the speed at which the second motor/generator 72 drives the accessories 76A-76N. Alternately or additionally, the second motor/generator 72 may be constructed so as to respond to voltage applied to it in one direction of voltage only (i.e. to utilize supplied alternating current in essentially one direction of current only). Thus, the speed of motor/generator 72 may be controlled separately from the speed of the first motor/generator 70 by controlling the offset, as well as the amplitude, of the voltage of the alternating current supplied to the two motor/generators, 70 and 72. This arrangement for selective operation of multiple accessory drive motors can be supplied by a separate terminal on the inverter $A_0$, as shown in FIG. 3, or by using one or more neutral points from other three-phase, Y-connected motors, such as $N_1$, shown in FIG. 2, supplying motors 62, 62A etc.

While the best modes for carrying out the invention have been described in detail, those familiar with the art to which this invention relates will recognize various alternative designs and embodiments for practicing the invention within the scope of the appended claims.

The invention claimed is:

1. An accessory drive system for a hybrid vehicle comprising:
a direct current battery;
an inverter operatively connected to the battery, said inverter configured to convert direct current from the battery into three-phase alternating current;
an electrically variable transmission operatively connected to the inverter, the electrically variable transmission including a first motor/generator and a second motor/generator, each operable to drive the hybrid vehicle, the first motor/generator being a Y-connected three phase motor/generator that defines a first neutral point and the second motor/generator being a Y-connected three phase motor/generator that defines a second neutral point; and
a third motor/generator connected to an accessory and to the first neutral point and the second neutral point, wherein output from the battery is transferable through said first neutral point and the second neutral point to the third motor/generator such that the accessory is drivable by either the first motor/generator or the second motor/generator at a selectable rate without sacrificing an output of the other of the first motor/generator and the second motor/generator.

2. The accessory drive system of claim 1, further comprising a fourth motor/generator operatively connected to a second accessory and the second neutral point, wherein output from the battery is transferable through said second neutral point to the fourth motor/generator such that the second accessory is driven at a selectable rate.

3. The accessory drive system of claim 1, further comprising a plurality of motor/generators connected in parallel to one of the third motor/generator and the fourth motor/generator.

4. The accessory drive system of claim 1, further comprising an engine driveably connected to the accessory via a torque transfer apparatus such that the accessory may be selectively driven by the engine or the third motor/generator.

5. The accessory drive system of claim 4, wherein the torque transfer apparatus includes a plurality of pulleys connected by a belt.

6. The accessory drive system of claim 5, further comprising a selectively engageable torque transmitting device configured to interrupt the transmission of torque from the third motor/generator to the engine such that the third motor/generator can be implemented to drive the accessory without also driving the engine.

7. The accessory drive system of claim 6, wherein the selectively engageable torque transmitting device is a one-way clutch.

* * * * *